United States Patent Office 3,498,998
Patented Mar. 3, 1970

3,498,998
QUATERNARY AMMONIUM COMPOUNDS OF
1,2,4-OXADIAZOLES
Graham K. Hughes and Leonard A. Tushaus, Minneapolis, Minn., assignors to Ashland Oil Refining Company, Ashland, Ky., a corporation of Kentucky
No Drawing. Filed Feb. 10, 1967, Ser. No. 615,082
Int. Cl. C07d 85/52
U.S. Cl. 260—307                2 Claims

ABSTRACT OF THE DISCLOSURE

This invention relates to novel quaternary ammonium compounds of 1,2,4-oxadiazoles, and to methods for their preparation and use.

---

Quaternary ammonium compounds are prepared, having the general formula:

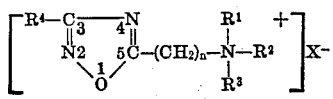

wherein $R^1$ and $R^4$ are hydrocarbon radicals of 6 to 20 carbon atoms, and may be substituted or unsubstituted. $R^2$ and $R^3$ are lower alkyl radicals of 1 to 4 carbon atoms, X is an anion, and $n$ is an integer equal to 1 to 4 inclusive.

Examples of these compounds are (3-phenyl-1,2,4-oxadiazolyl-5-methyl) - lauryl-dimethyl-ammonium chloride, (3-coco-1,2,4-oxadiazolyl - 5 - methyl)-benzyl-dimethyl-ammonium chloride, and (3-tallow-1,2,4-oxadiazolyl-5-methyl)-lauryl-diethyl-ammonium bromide. These compounds are prepared by reacting a tertiary amine, e.g. lauryl dimethyl amine with a 1,2,4-oxadiazole, e.g. 3-phenyl-5-chloromethyl-1,2,4-oxadiazole.

The preferred hydrocarbon radicals are alkyl and aryl radicals and the preferred anion is a halogen ion and especially preferred are chlorine, bromine, and iodine. The preferred aryl radicals are those derived from benzene. Non-interfering substituents on the alkyl and aryl radicals include phenyl, benzyl, lower alkyl, lower alkoxy, OH, COOH, F, Cl, Br, I, and $NO_2$. Specific examples of the compounds of the present invention include (3-phenyl-1,2,4-oxadiazolyl - 5 - methyl)-lauryl-dimethyl-ammonium chloride, (3-coco-1,2,4-oxadiazolyl-5-methyl)-benzyl-dimethyl-ammonium chloride, and (3-tallow-1,2,4-oxadiazolyl-5-methyl)-lauryl-diethyl-ammonium bromide.

The compounds of the present invention can be synthesised by reacting a tertiary amine of Formula II:

(II)     

with a 1,2,4-oxadiazole of Formula III:

(III)     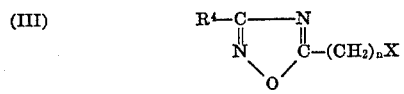

wherein $R^1$, $R^2$, $R^3$, $R^4$, X, and $n$ have the above-described meanings.

Examples of specific compounds of Formula II include, among others, lauryl dimethyl amine, octylthiapropyl dimethyl amine, benzyl dimethyl amine, β-hydroxy octadecyl dimethyl amine, and β-chloro stearyl diethyl amine. Specific examples of compounds of Formula III include, among others, 3-phenyl-5-chloromethyl-1,2,4-oxadiazole; 3-coco-5-bromomethyl-1,2,4-oxadiazole; 3-coco-5-chloromethyl-1,2,4-oxadiazole; 3-tallow-5-iodomethyl-1,2,4-oxadiazole; and 5-chloropropyl-1,2,4-oxadiazole.

In general, the compounds of the present invention are synthesized by mixing the oxadiazole of Formula III with the tertiary amine of Formula II at a temperature between 0° and 150° C. and preferably between 55° and 95° C. The reaction proceeds without the necessity of a catalyst in the presence of any suitable solvent such as water or lower alkanols such as methanol or ethanol. Other inert solvents such as ethyl ether, benzene, xylene, toluene, and the like, can also be used. The tertiary amine and the oxadiazole can be combined in stoichiometric amounts or, preferably, with the molar excess of from 0.5% to 10% and more preferably from 1% to 2% of the oxadiazole. The reaction is generally complete in six to twelve hours when employing the preferred temperature. Although atmospheric pressure is preferred for convenience, super-atmospheric and sub-atmospheric pressures can also be employed. It is preferred to add the oxadiazole slowly to the tertiary amine while maintaining the reaction mixture within the above-described temperature. After addition of the oxadiazole is complete, agitation and heating are continued until the reaction is complete, as indicated by an analysis showing less than 1% free tertiary amine.

The tertiary amines useful in the present invention are either known compounds or can be produced by reactions well known in the art, from fatty triglycerides such as those derived from coconut oil or tallow.

Likewise, the 1,2,4-oxadiazoles useful in the present invention are either known reactants or can be produced by procedures well-known in the art.

The compounds of the present invention find utility as fabric softeners, sanitizers, bacteriostatics, and aquatic weed control agents. Because of their high solubility in water, they can be used in greater concentrations than most other compounds previously used for similar purposes.

The present invention may be better understood by reference to the following examples, wherein parts and percentages are by weight unless otherwise specified. These examples are designed to teach those skilled in the art how to practice this invention and to illustrate the best mode contemplated for the practice of the invention, and are not intended to limit the scope thereof in any manner.

Example 1

This example illustrates the synthesis of (3-phenyl-1,2,4-oxadiazolyl-5-methyl)-lauryl-dimethyl - ammonium chloride.

A quantity of 3-phenyl-5-chloromethyl-1,2,4-oxadiazole (48.6 g., 0.25 mole) is dissolved in isopropanol (59.7 g.). This solution is added over a period of one-half hour to a flask containing lauryl dimethyl amine (57.5 g., 0.25 mole). During the addition, the temperature is maintained at 65° to 75° C. Water (10.6 g.) is then added to the reaction flask and the mixture is refluxed for six hours. The (3-phenyl-1,2,4-oxadiazolyl-5-methyl)-lauryl-dimethyl-ammonium chloride precipitates as white plates having a melting point of 177° to 178° C. The analysis calculated for C, 67.7%; H, 9.3%; Cl, 8.7%; and N, 10.3% was found to be: C, 67.14%; H, 9.39%; Cl, 8.88%; and N, 9.91%.

Example 2

This example illustrates the fabric-softening utility of the compounds of the present invention and particularly (3 - hard tallow-1,2,4-oxadiazolyl-5-methyl)-(2-hydroxy-$C_{15-18}$ alkyl)-dimethyl-ammonium chloride and (3-coco-1,2,4 - oxadiazolyl-5-methyl)-(2-hydroxy-$C_{15-18}$ alkyl)-dimethyl-ammonium chloride.

In separate runs, each of the compounds were applied at a level of 0.1% of the dry weight of 5 towels. The towels and softener were placed in water, agitated, then removed and allowed to dry in air. As compared to a softness rating of 5 prior to the treatment, the softness rating of the towels treated with (3-hard tallow-1,2,4-oxadiazolyl-5-methyl)-(2-hydroxy-$C_{15-18}$ alkyl)-dimethyl-ammonium chloride was 1.8. The softness rating for the towels treated with (3-coco-1,2,4-oxadiazolyl-5-methyl)-(2-hydroxy-$C_{15-18}$ alkyl)-dimethyl-ammonium chloride was 2.2.

To illustrate the degree of softness obtained above, two more runs were conducted. In the first run a commercially-available fabric softener, Adogen 442 (dimethyl di-[hydrogenated tallow] quaternary ammonium chloride, a product of the Archer-Daniels-Midland Company) was tested in the same procedure at a level of 0.075% by weight of the towels. A softness rating of 1.2 to 1.3 was obtained. The softness rating was determined in a subjective test, using a scale of 0–5, 0 being the softest and 5 being unsoftened.

Example 3

This example illustrates the bacteriostatic qualities of compounds of the present invention and especially of (3-phenyl-1,2,4-oxadiazolyl - 5 - methyl)-lauryl-dimethyl ammonium chloride, the product of Example 1.

Solutions of (3 - phenyl-1,2,4-oxadiazolyl-5-methyl)-lauryl-dimethyl ammonium chloride containing 50, 200, 400, 1,000 and 2,000 p.p.m. active ingredients were tested with carriers contaminated with *staphylococcus aureus* ATCC 6538 and *Escherichia coli* ATCC 11229. The test procedure used was that for the use-dilution test given in Official Methods of Analysis of the A.O.A.C., 9th edition, p. 65. The single variation in the official procedure was the use of two carriers in each test instead of 10, as specified. The minimum germicidal levels of the test materials in p.p.m. were 200 p.p.m. *S. aureus* and 400 p.p.m. *E. coli*.

In comparison, the identical procedure was used to determine the bacteriostatic qualities of a commercially available sanitizer, namely a mixture of lauryl dimethyl benzyl ammonium chloride and lauryl dimethyl diethyl benzyl ammonium chloride. The minimum germicidal levels for this sanitizer were 200 p.p.m. *S. aureus* and 400 p.p.m. *E. coli*.

Although the invention has been described in considerable detail with reference to certain preferred embodiments thereof, it will be understood that variations and modifications can be effected within the spirit and scope of the invention as described above and as defined in the appended claims.

What is claimed is:

1. (3-coco-1,2,4-oxadiazolyl-5-methyl)-benzyl - dimethyl-ammonium chloride.

2. (3 - tallow-1,2,4-oxadiozolyl-5-methyl)-lauryl-diethyl-ammonium chloride.

References Cited

UNITED STATES PATENTS 3,141,019   7/1964   Palazzo et al. _____ 260—307

ALTON D. ROLLINS, Primary Examiner

U.S. Cl. X.R.

71—66; 117—139.5; 260—999